United States Patent Office 2,728,736
Patented Dec. 27, 1955

2,728,736

ORGANOSILICON COMPOSITIONS CONTAINING ZIRCONIUM COMPOUND AND LEATHER TREATED WITH SAME

Melvin J. Hunter and Charles F. Dudley, Midland, Mich., assignors to Dow Corning Corporation, Midland, Mich., a corporation of Michigan No Drawing. Application June 21, 1954, Serial No. 438,326

10 Claims. (Cl. 260—29.1)

This invention relates to organosilicon compositions and to leather articles impregnated therewith.

One of the perennial problems encountered in the leather industry, particularly that pertaining to footwear, is to provide a water repellent material which will prevent or greatly retard the passage of water through the leather without preventing the passage of air. This has the effect of keeping the feet dry from exterior moisture and at the same time allowing the evaporation of perspiration. The products of this invention fulfill these requirements.

It is the object of this invention to provide a novel composition of matter which is useful as a water repellent particularly when used to impregnate leather. Another object of this invention is to provide a material which when introduced into leather will increase the weatherability and life of the leather under outdoor service conditions. Another object is to provide a treatment for leather which will protect it from chemical solutions which cause untreated leather to dehydrate and crack. Other objects and advantages will be apparent from the following description.

This invention relates to a composition of matter comprising a mixture of (1) 15 to 50% by weight of a zirconium compound of the formula $Zr(OR)_4$ or aliphatic hydrocarbon soluble partial hydrolyzates thereof in which zirconium compounds R is an aliphatic hydrocarbon radical of less than 13 carbon atoms or a hydroxylated aliphatic hydrocarbon radical of less than 13 carbon atoms containing less than 4 hydroxyl groups; (2) 5 to 70% by weight of a methylpolysiloxane resin composed of trimethylsiloxane units and $SiO_2$ units in such proportion that the ratio of methyl radicals to silicon atoms is from 1:1 to 2.5:1 and (3) 15 to 80% by weight of polysiloxanes having the general formula $$R'_n SiO_{\frac{4-n}{2}}$$

where R' is an alkyl or alkenyl radical of less than 6 carbon atoms or a monocyclic aryl radical and $n$ has an average value of from 2 to 2.9 inclusive.

The compositions of this invention may be prepared be merely mixing ingredients (1), (2) and (3). The mixing may be accomplished either with the undiluted materials or by employing a common solvent. Suitable solvents include hydrocarbon solvents such as toluene, petroleum hydrocarbons and the like and halogenated solvents such as perchloroethylene, methylene chloride and the like.

The zirconium compounds (1) suitable for employment in this invention are those esters having the general formula $Zr(OR)_4$ where R is any aliphatic hydrocarbon radical of less than 13 carbon atoms or any hydroxylated aliphatic hydrocarbon radical of less than 13 carbon atoms and containing less than 4 hydroxyl radicals and any partially hydrolyzed derivatives thereof which are soluble in hydrocarbon or halogenated hydrocarbon solvents. Specific examples of operative compounds are tetramethylzirconate, tetraethylzirconate, tetradecylzirconate, octaleneglycolylzirconate, tetra-2-ethylhexylzirconate, tetradodecylzirconate, tetraisopropylzirconate, tertiary-butyltrimethylzirconate and mixtures and partial hydrolyzates thereof. Preferably the R group should have at least 3 carbon atoms. These compounds may be prepared by any of the methods well known in the art. The preferred compounds are those in which R contains from 4 to 8 carbon atoms inclusive.

The methylpolysiloxane resins (2) which are employed herein are composed essentially of trimethylsiloxane units and $SiO_2$ units but may contain traces of dimethylsiloxane units and/or monomethylsiloxane units. These copolymers may be prepared by cohydrolyzing $Me_3SiX$ and $SiX_4$ where X is a hydrolyzable radical. Another method by which these materials may be prepared is that of reacting the methylchlorosilanes, methylalkoxysilanes or hexamethyldisiloxane with an acidic silica sol. Regardless of the method employed the ratio of methyl radicals to silicon radicals in the copolymer must be from 1:1 to 2.5:1 with the preferred range being from 1:1 to 1.5:1.

Organopolysiloxanes (3) which are operative herein include those in which R' can be any alkyl or alkenyl radical of less than 6 carbon atoms or any monocyclicaryl radical. Specific examples of operative siloxanes are dimethylpolysiloxane, vinylmethylsiloxane, vinylethylsiloxane, dipropylsiloxane, methylxenylsiloxane or any mixture thereof. Also copolymers of these diorganosiloxanes with triorganosiloxanes such as trimethylsiloxane, phenyldimethylsiloxane, hexenyldiethylsiloxane and amyldimethylsiloxane are operative. Monoorganosiloxane units can also be present in these siloxanes so long as the value of $n$ remains substantially in the range specified.

The organosiloxanes (3) are benzene soluble materials which can vary in viscosity from thin fluids to deformable solids. Generally fluid polymers having a viscosity ranging from 5 to 100,000 cs. at 25° C. are preferred.

One of the primary uses of the compositions of this invention is that of rendering leather water repellent. This is accomplished preferably by employing a solvent solution of the siloxane using any solvents which are harmless to leather such as those specified above. The leather may be treated in any suitable manner such as by spraying, dipping, or padding. Suitable results are obtained when the leather contains from .5 to 50% by weight of the siloxane compositions. In general 2 to 25% by weight is preferred. Ordinarily, two applications with a 15% solution of the composition of this invention is sufficient to give the desired pickup.

The compositions of this invention improve the water repellency of any leather either tanned, tawed or otherwise cured and either finished or unfinished leather. They are also applicable to leather from any type of animal such as horsehide, pigskin, kid, cowhide and the like.

In the examples below the water repellency of the leather was tested by impregnating pieces of leather measuring 4" x 4⅜" and varying from between .05 to .06" in thickness. These were tested in an Upper Leather Water Penetration Machine which was a slight modification of that pictured and described on pages 401 and 402 of the August 1947 issue of "Journal of The American Leather Chemists Association." Preferably the testing machine consists of a pair of V clamping heads, one of which is movable downward over an arc of 30°. The leather sample is clamped to the V heads to form a leather trough which is sealed at each end by means of gasketed V blocks.

The leather trough so formed is partially immersed in water and flexed by the movable head. Such flexing produces a single wrinkle in the center of the trough and simultaneously places the upper edges of the leather trough under tension. The machine runs at 72 flexes per minute. The number of flexes required for the leather to wet through is determined by observing the appearance of a tiny bead of water which usually appears at either end of the wrinkle. The number of cycles required for the appearance of this drop of water is known as the "first drop" number.

This invention is illustrated by the following examples but is not limited thereto, the proper limits of the invention being set forth in the appended claims.

EXAMPLE 1

The composition employed in the following example was as follows:

A. Tetrabutylzirconate,
B. A methylpolysiloxane copolymer composed of $Me_3SiO$ units and $SiO_2$ units having a Me/Si ratio of 1.2:1, and
C. A methylpolysiloxane copolymer fluid of 350 cs. viscosity composed of trimethylsiloxane units and dimethylsiloxane units.

Pieces of chrome tanned fat liquored cowhide having from 10 to 15% by weight vegetable tanning material present therein were treated with varying proportions of ingredients A, B and C and thereafter tested in the water penetration machine as described above. In each case a 15% by weight solution of the composition in Stoddard solvent (B. P. 308 to 380° F.) was employed. The results are shown in Table I below.

TABLE I

| Mixture No. | Composition of Mixture in percent by Weight | | | Average Pickup in percent by Weight | First Drop No. |
|---|---|---|---|---|---|
| | A | B | C | | |
| 1 | 100 | | | 5.2 | about 125 |
| 2 | | 100 | | 19.6 | 101 |
| 3 | | | 100 | 13.8 | 176 |
| 4 | 33.3 | 33.3 | 33.3 | 12 | {14392 {24556 |
| 5 | 70 | | 30 | 7.8 | about 600 |
| 6 | 50 | 50 | | 7.6 | about 800 |
| 7 | | 70 | 30 | 20.4 | 148 |

Runs 1, 2, 3, 5, 6 and 7 show the greatly inferior results obtained by compositions outside the scope of this invention. The unimpregnated leather had first drop values ranging from 36 to 75.

EXAMPLE 2

First drop values in excess of 1500 are obtained employing ingredients A, B and C of Example 1 in the method of that example when those ingredients are used in the following proportions.

*Composition of mixture in per cent by weight*

| A | B | C |
|---|---|---|
| 17.5 | 17.5 | 65 |
| 20 | 5 | 75 |
| 20 | 56 | 24 |

In all cases the pickup of the leather is between 12 to 13% by weight.

EXAMPLE 3

When the procedure of Example 1 is employed using a 15% by weight solution of a composition composed of equal parts by weight of ingredients B, C and the zirconium compounds listed in Table II, results equivalent to those of Example 2 were obtained.

TABLE II

| Compound: | Per cent by weight pickup |
|---|---|
| Tetra-2-ethylhexylzirconate | 12.2 |
| Octaleneglycolylzirconate | 14.6 |
| Tetraisopropylzirconate | 13.5 |
| Tetradodecylzirconate | 10 |
| Tetrapentenylzirconate | 20 |

EXAMPLE 4

Equivalent results are obtained when equal mixtures of A, B and a 100,000 cs. phenylmethylsiloxane or ethylvinylsiloxane fluids are employed in the procedure of Example 1.

That which is claimed is:

1. A composition of matter comprising a mixture of (1) from 15 to 50% by weight of a zirconium compound selected from the group consisting of zirconium compounds having the general formula $Zr(OR)_4$ and aliphatic hydrocarbon soluble partial hydrolyzates thereof in which compounds R is selected from the group consisting of aliphatic hydrocarbon radicals of less than 13 carbon atoms and hydroxylated aliphatic hydrocarbon radicals of less than 13 carbon atoms and containing less than 4 hydroxyl radicals; (2) from 5 to 70% by weight of a methylpolysiloxane copolymer composed essentially of trimethylsiloxane units and $SiO_2$ units, said units being in such proportion that the ratio of methyl radicals to Si atoms is from 1:1 to 2.5:1 and (3) 15 to 80% by weight of a polysiloxane having the general formula $$R'_n SiO_{\frac{4-n}{2}}$$

where R' is selected from the group consisting of alkyl and alkenyl radicals of less than 6 carbon atoms and monocyclic aryl radicals and n has an average value of from 2 to 2.9 inclusive, each silicon atom in said polysiloxane (3) having at least one of the defined hydrocarbon radicals attached thereto.

2. The composition of claim 1 where R' is an alkyl radical of less than 4 carbon atoms.

3. An article of manufacture comprising leather impregnated with .5 to 50% by weight based on the weight of the leather of the composition of claim 1.

4. The composition of claim 1 where R is a butyl radical.

5. A composition of matter comprising (1) 5 to 50% by weight of a zirconium compound selected from the group consisting of zirconium compounds having the general formula $Zr(OR)_4$ and aliphatic hydrocarbon soluble partial hydrolyzates therof, in said compounds R being selected from the group consisting of aliphatic hydrocarbon radicals of less than 13 carbon atoms and hydroxylated aliphatic hydrocarbon radicals of less than 13 carbon atoms and containing less than 4 hydroxyl radicals, (2) 5 to 70% by weight of a methylpolysiloxane composed essentially of trimethylsiloxane units and $SiO_2$ units, said units being in such proportion that the ratio of methyl radicals to silicon atoms is from 1:1 to 1.5:1 and (3) 15 to 80% by weight of a polysiloxane having the general formula $$R'_n SiO_{\frac{4-n}{2}}$$

where R' is selected from the group consisting of alkyl and alkenyl radicals of less than 6 carbon atoms and monocyclic aryl radicals and n has an average value of from 2 to 2.9 inclusive, each silicon atom in said polysiloxane (3) having at least one of the defined hydrocarbon radicals attached thereto.

6. A composition of claim 5 where R is butyl.

7. An article of manufacture comprising leather impregnated with from .5 to 50% by weight based on the weight of the leather of the composition of claim 5.

8. A composition of matter comprising (1) 15 to 50% by weight of a zirconium compound of the formula $Zr(OR)_4$ in which R is an aliphatic hydrocarbon radical having from 4 to 8 inclusive carbon atoms, (2) 5 to 70% by weight of a methylpolysiloxane composed essentially of trimethylsiloxane units and $SiO_2$ units, said units being in such proportion that the ratio of methyl radicals to silicon atoms is from 1:1 to 1.5:1 and (3) 15 to 80% by weight of a polysiloxane of the formula $$Me_nSiO_{\frac{4-n}{2}}$$

where $n$ has an average value from 2 to 2.9 inclusive, each silicon atom in polysiloxane (3) having at least 1 methyl radical attached thereto.

9. The composition of claim 8 wherein R is a butyl radical.

10. An article of manufacture comprising leather impregnated with from .5 to 50% by weight based on the weight of the leather of the composition of claim 8.

References Cited in the file of this patent

UNITED STATES PATENTS

| | | |
|---|---|---|
| 2,670,303 | Mailander | Feb. 23, 1954 |
| 2,672,455 | Currie | Mar. 16, 1954 |

OTHER REFERENCES

Wardlav et al.: Research (London), vol. 3, pages 462–5 (1950).

UNITED STATES PATENT OFFICE
CERTIFICATE OF CORRECTION

Patent No. 2,728,736                 December 27, 1955

Melvin J. Hunter et al.

It is hereby certified that error appears in the above numbered patent requiring correction and that the said Letters Patent should read as corrected below.

Column 4, line 47, for "5" read -- 15 --.

Signed and sealed this 12th day of June 1962.

(SEAL)
Attest:

ERNEST W. SWIDER
Attesting Officer

DAVID L. LADD
Commissioner of Patents